G. J. WEYH.
HORSE RELEASER.
APPLICATION FILED JULY 16, 1908.
912,515.
Patented Feb. 16, 1909.
2 SHEETS—SHEET 1.
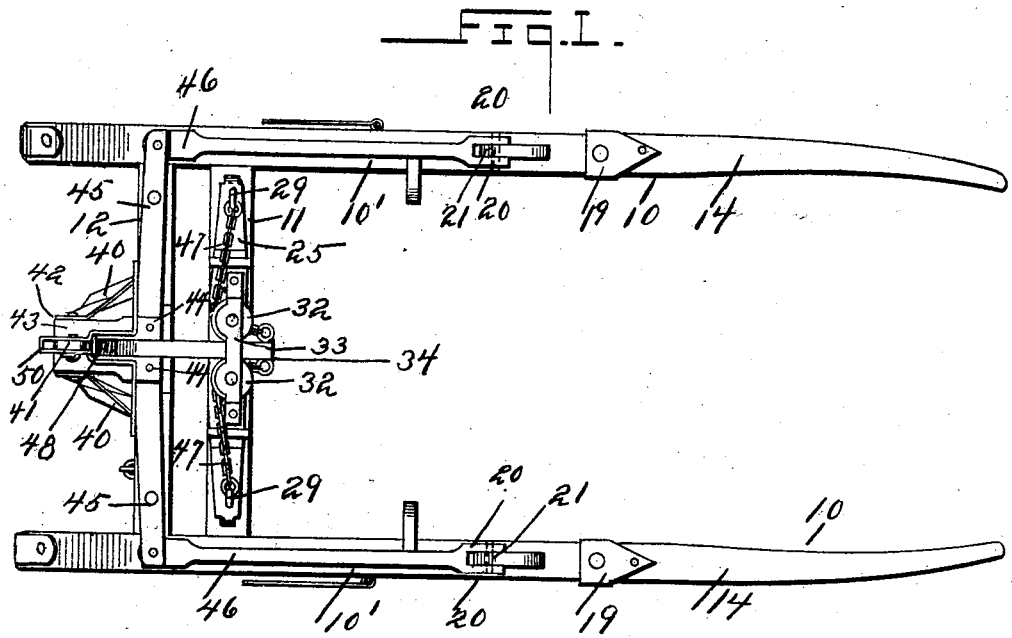
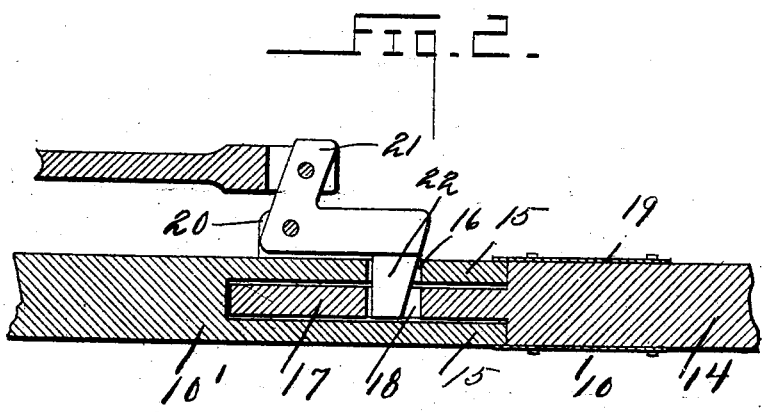
Witnesses
E. C. Johansen
E. L. Chandler
Inventor
George J. Weyh
By Woodward & Chandler
Attorney

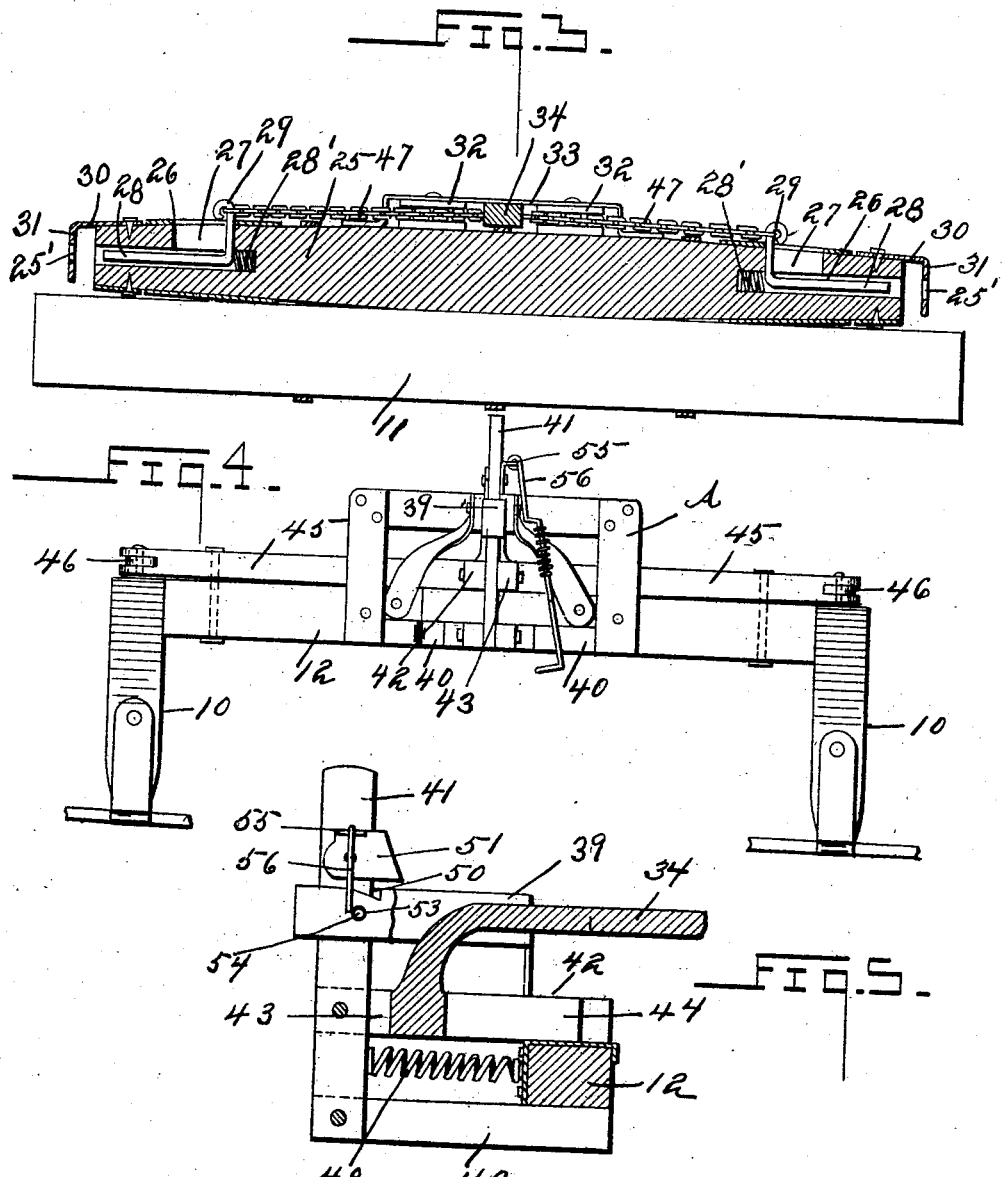

UNITED STATES PATENT OFFICE.

GEORGE J. WEYH, OF ARMOUR, SOUTH DAKOTA.

HORSE-RELEASER.

No. 912,515.   Specification of Letters Patent.   Patented Feb. 16, 1909.

Application filed July 16, 1908. Serial No. 443,880.

*To all whom it may concern:*

Be it known that I, GEORGE J. WEYH, a citizen of the United States, residing at Armour, in the county of Douglas and State of South Dakota, have invented certain new and useful Improvements in Horse-Releasers, of which the following is a specification.

This invention relates to harness, and more particularly to means for releasing a horse from a vehicle, and has for its object to provide such a means which will insure the release of animals completely from a vehicle.

A particular object of the invention is to provide a device for releasing all harness connections between an animal and a vehicle, including the fastening attached to shaft or pole, as well as those connected to swingle tree and similar part of draft fixtures.

Another object is to provide such a device which may be used on various types of vehicles.

Other objects and advantages will be apparent from the following description, and it will be understood that changes in the structure shown and described may be made within the scope of the claims, and that any suitable materials may be used without departing from the spirit of the invention.

In the drawings forming a portion of this specification, and in which like numerals of reference indicate similar parts in the several views, Figure 1 is a top plan view of the device, Fig. 2 is a detailed longitudinal sectional view of the sectional shaft, Fig. 3 is a longitudinal sectional view through the swingle tree and support, Fig. 4 is a rear elevation of the device, Fig. 5 is a cross sectional view of the operating mechanism.

Referring to the drawings, there is shown a pair of shafts 10 having spaced cross pieces 11 and 12 therebetween. The shaft 10 comprises detachable sections 10' and 14, the rear section 10' having a socket 15 extending rearwardly therein and having a slot 16 communicating therewith through the upper face of the shaft, as shown. The front sections 14 are each provided with a reduced shank or tongue 17 having a passage 18 vertically therethrough, the shank being adapted to engage revolubly in the socket 15 with the passage 18 in registry with the slot 16. Carried by the front section 14, and projecting rearwardly in spaced relation with the tongues 17 there is a collar 19 of suitable material adapted to engage over the forward end portion of the section 10' of the shaft to reinforce the joint of the two sections.

Rearwardly of the slot 16, two spaced pivot ears 20 are carried by the section 10', and have pivoted thereon latch members 21 comprising integral right angled arms, one extending vertically, the other horizontally to the slot 16 and carrying a dependent tongue 22 adapted for sliding engagement through the slot 16 upon oscillation of the member 21.

Pivoted centrally upon the cross piece 11 there is a swingle tree 25 of a usual type, the opposite end portions of which have longitudinally extending passages 26 formed therein, and have slots 27 formed in the upper sides communicating with said passages. Engaged slidably within the passages 26 there are bolts 28 having laterally projecting eye bolts 29 disposed through the slots 27 as shown. Springs 28' are disposed in the passage 26 inwardly of and bearing against the bolts 28 to hold them yieldably at the outer limit of their movement. Engaged over the outer ends of the swingle tree there are collars 30 carrying integral pendent ears 31 spaced outwardly of the end of the swingle tree 25, and having openings 25' therethrough, in registry with the passage 26, to receive the bolt 28 slidably therein when at the outer limit of its movement. Centrally of the swingle tree, upon its upper face, there are pivoted spaced pulleys 32 having a retaining yoke 33 engaged thereover and secured to the swingle tree outwardly of the pulleys, and serving as a guide for an operating arm 34 disposed slidably between the pulleys and subsequently to be described.

Pivoted by its lower end to a suitable support 40, carried by the cross piece 12, there is a primary lever 41 extending vertically and positioned rearwardly of the cross piece 12. The support 40 is attached to the lower side of the cross bar 12, as shown. Attached intermediately of the lever 41, there is a double forked or approximately H shaped member 42, carrying the arm 34 which extends from the central portion of the member 42 in a forward direction being offset upwardly therefrom. The H shaped portion of the member 42 comprises spaced rear arms 43 and similar forward arms 44, having pivotally engaged therewith outwardly extending levers 45 pivoted upon the beam 12, as shown. Pivotally engaged between the outer ends of the levers 45 and the upright arms of the latch members 21 on the shaft there are connecting rods 46. As will be seen, the arm 34 is disposed slidably between the pulleys 32 and carries two chains 47 extending oppositely therefrom, rearwardly and outwardly around the pulleys 32 to engage with the respective eye bolts 29 carried by the bolts 28 at the opposite ends of the swingle tree. A spring 48 is engaged between the lever 41 and the cross piece 12, to hold the lever at the rearward limit of its movement. It will be seen that upon forward movement of the lever 41 the member 42 will engage the levers 45 to operate the connecting rods 46 and latch member 21; the arm 34 will also be pushed forwardly, the chains 47 drawing the pins 28 inwardly as will be understood.

A guide member A is secured to the cross piece 12, and comprises a frame having a guide portion 39 formed therein in which the lever 41 is slidably engaged, the upper edges of the back portion of the guide portion having notches 50 formed therein, as shown. Pivoted to the lever 41 there is a dog member 51 adapted to engage in the notch 50 to hold the lever at the rearward limit of its movement. Beneath the notches 50 there are formed registering openings 53 adapted to receive a pin 54 therethrough behind the lever 41 to hold the lever at times at the forward limit of its movement.

The dog 51' carries an upwardly extending ear 55 to which there is engaged an operating rod 56 adapted to be extended rearwardly to an adjacent vehicle body.

Normally the lever 41 is held at the rearward limit of its movement by the engagement of the dog 51 in the notch 50, as shown. When it is desired to operate the device, the lever 55 is pulled rearwardly, thus disengaging the dog from the notch 50 and allowing the lever to spring forward slightly. The rod is then forced forwardly, to move the lever and operate the device as will be apparent.

It will be understood, that if it is desired, the latch mechanism comprising portions numbered from 15 to 21 may be incorporated in a wagon tongue, for use with a double releasing device.

What is claimed is:

1. In a device of the class described, the combination with a swingle tree having longitudinally slidable members at its opposite ends, of pulleys mounted centrally thereon, a member slidably engaged between said pulleys and carrying chains extending oppositely therefrom around said pulleys, and connected with said sliding member, and means for operating said member to draw on the chains and operate the said sliding members.

2. In a releasing mechanism, the combination with sectional shafts of a cross piece carried therebetween, laterally extending levers pivoted upon the cross piece, means for oscillating said levers simultaneously, a latch mechanism carried by said shaft to hold the sections in co-engagement, and connections between said levers and said latches for operation to release said sections from co-engagement.

3. A horse releaser comprising sectional shafts, swingle trees carried therebetween, a cross piece disposed rearwardly of the swingle tree, tug releasing means carried by said swingle tree, means for detaching said sectional shafts, a vertical lever pivoted to said cross piece, coöperative connections between said lever, said tug releasing means and said shaft detaching means, means for holding said lever at the rearward limit of its movement, at times, means for holding said lever at the forward limit of its movement at times, and means for operating said lever to release tug members from said swingle tree and detach said sectional shafts.

In testimony whereof I affix my signature, in presence of two witnesses.

GEORGE J. WEYH.

Witnesses:
ANTHONY KIEFER,
ANNIE WEYH.